(12) United States Patent
Fahrenbruck et al.

(10) Patent No.: US 8,298,490 B2
(45) Date of Patent: Oct. 30, 2012

(54) SYSTEMS AND METHODS OF PRODUCING TRICHLOROSILANE

(75) Inventors: Scott Fahrenbruck, Missoula, MT (US); Bruce Hazeltine, Missoula, MT (US)

(73) Assignee: GTAT Corporation, Merrimack, NH (US)

( * ) Notice: Subject to any disclaimer, the term of this patent is extended or adjusted under 35 U.S.C. 154(b) by 434 days.

(21) Appl. No.: 12/614,269

(22) Filed: Nov. 6, 2009

(65) Prior Publication Data

US 2011/0110839 A1  May 12, 2011

(51) Int. Cl.
*B01J 19/00* (2006.01)
*C01B 33/107* (2006.01)

(52) U.S. Cl. ........ 422/129; 422/211; 422/207; 422/234; 422/235; 423/342

(58) Field of Classification Search .............. 422/129, 422/211, 207, 234, 235; 423/342
See application file for complete search history.

(56) References Cited

U.S. PATENT DOCUMENTS

| | | | |
|---|---|---|---|
| 2,406,605 A | 8/1946 | Hurd | |
| 2,458,703 A | 1/1949 | Hatcher | |
| 2,595,620 A | 5/1952 | Wagner et al. | |
| 2,606,811 A | 8/1952 | Wagner | |
| 2,657,114 A | 10/1953 | Wagner | |
| 3,163,590 A | 12/1964 | Litz et al. | |
| 3,968,199 A | 7/1976 | Bakay | |
| 4,099,936 A | 7/1978 | Tarancon | |
| 4,117,094 A | 9/1978 | Blocher, Jr. et al. | |
| 4,130,632 A | 12/1978 | Braunsperger et al. | |
| 4,217,334 A | 8/1980 | Weigert et al. | |
| 4,340,574 A | 7/1982 | Coleman | |
| 4,424,198 A | 1/1984 | Ito et al. | |
| 4,526,769 A | 7/1985 | Ingle et al. | |
| 4,676,967 A | 6/1987 | Breneman | |
| 4,941,893 A | 7/1990 | Hsieh et al. | |
| 5,118,486 A | 6/1992 | Burgie et al. | |
| 5,126,112 A | 6/1992 | Burgie | |
| 5,232,602 A | 8/1993 | Brink et al. | |
| 5,422,088 A | 6/1995 | Burgie et al. | |
| 5,723,644 A | 3/1998 | Tzou | |

(Continued)

FOREIGN PATENT DOCUMENTS

EP  0 450 393 A2  10/1991

(Continued)

OTHER PUBLICATIONS

English Abstract for JP 2004-256338 A (Sep. 2004).*

(Continued)

*Primary Examiner* — Jennifer A Leung
(74) *Attorney, Agent, or Firm* — Lando & Anastasi, LLP (57) ABSTRACT

The present invention is directed to systems and methods of synthesizing trichlorosilane. The disclosed systems and methods can involve increasing the concentration of the solids in the slurry to recover or separate the volatilized metal salts and reduce the obstructions created by the solidification of the metal salts in downstream operations of the during trichlorosilane synthesis. Rather than heating to raise the temperature to vaporize chlorosilane compounds, and subsequently condensing the volatilized chlorosilane compounds, the present invention can involve increasing the solids concentration in the slurry stream by utilizing a non-condensable gas, such as hydrogen, to volatilize the chlorosilane components, which can consequently promote evaporative conditions that can reduce the slurry temperature. The lower slurry temperature results in a lower volatility of the metal salts, which reduces the likelihood of carryover to downstream unit operations.

7 Claims, 2 Drawing Sheets

U.S. PATENT DOCUMENTS

| | | |
|---|---|---|
| 5,906,799 A | 5/1999 | Burgie et al. |
| 6,060,021 A | 5/2000 | Oda |
| 6,843,972 B2 | 1/2005 | Klein et al. |
| 6,852,301 B2 | 2/2005 | Block et al. |
| 6,887,448 B2 | 5/2005 | Block et al. |
| 6,905,576 B1 | 6/2005 | Block et al. |
| 6,942,844 B2 | 9/2005 | Muller et al. |
| 7,033,561 B2 | 4/2006 | Kendig et al. |
| 7,056,484 B2 | 6/2006 | Bulan et al. |
| 7,323,155 B2 | 1/2008 | Klein et al. |
| 2002/0044904 A1 | 4/2002 | Bulan et al. |
| 2004/0022713 A1 | 2/2004 | Bulan et al. |
| 2004/0042949 A1 | 3/2004 | Block et al. |
| 2004/0047793 A1 | 3/2004 | Mieczko et al. |
| 2004/0047794 A1 | 3/2004 | Pfaffelhuber et al. |
| 2004/0101463 A1 | 5/2004 | Bulan et al. |
| 2005/0074387 A1 | 4/2005 | Bulan et al. |
| 2007/0092425 A1 | 4/2007 | Lloyd |
| 2007/0231236 A1 | 10/2007 | Kajimoto et al. |
| 2008/0112875 A1 | 5/2008 | Garcia-Alonso et al. |
| 2009/0035205 A1 | 2/2009 | Bohmhammel et al. |
| 2009/0060820 A1 | 3/2009 | Shimizu et al. |

FOREIGN PATENT DOCUMENTS

| | | | |
|---|---|---|---|
| EP | 0 444 190 B1 | | 11/1994 |
| JP | 8277104 | | 10/1996 |
| JP | 2004256338 A | * | 9/2004 |
| JP | 2008137885 | | 6/2008 |
| JP | 2008184378 | | 8/2008 |
| WO | 0039027 A1 | | 7/2000 |
| WO | 0222501 A1 | | 3/2002 |
| WO | 0240401 A1 | | 5/2002 |
| WO | 0248034 A1 | | 6/2002 |
| WO | 0248035 A1 | | 6/2002 |
| WO | 2006054325 A2 | | 5/2006 |
| WO | 2007035108 A1 | | 3/2007 |

OTHER PUBLICATIONS

Machine Translation for JP 2004-256338 A (Sep. 2004).*

* cited by examiner

SYSTEMS AND METHODS OF PRODUCING TRICHLOROSILANE

BACKGROUND

1. Field of the Invention

The present invention relates to systems and methods of producing trichlorosilane and, in particular, to systems and methods of synthesizing trichlorosilane that utilize vaporization techniques to facilitate removal of byproduct solids, such as metal salts, to reduce the likelihood of deposition thereof in downstream unit operations.

2. Discussion of Related Art

Wagner et al., in U.S. Pat. No. 2,595,620, disclosed a hydrogenation process involving substitution of hydrogen atom for one or more silicon-bonded chlorine atoms.

Bakay, in U.S. Pat. No. 3,968,199, disclosed a process for making silane, $SiH_4$, by the disproportionation or redistribution of trichlorosilane, $HSiCl_3$.

Tarancon, in U.S. Pat. No. 4,099,936, disclosed a process for the purification of silane involving passing a mixture of silane with impurities through porous granular charcoal and through porous, granular magnesium silicate, and distillation.

Coleman, in U.S. Pat. No. 4,340,574, disclosed a process for the production of ultrahigh purity silane with recycle from separation columns.

Breneman, in U.S. Pat. No. 4,676,967, disclosed a process for producing high purity silane and silicon.

Burgie et al., in U.S. Pat. No. 5,118,486, disclosed separation by atomization of a byproduct stream into particulate silicon and silanes.

Brink et al., in U.S. Pat. No. 5,232,602, disclosed a method for the purification of tetrachlorosilane for the manufacture of electronic grade silicon, involving removal of trace impurities of phosphorus by contacting with activated charcoal.

Tzou, in U.S. Pat. No. 5,723,644, disclosed a method of purifying chlorosilanes by contacting a mixture comprising chlorosilane with phosphorus contaminant with an adsorbent of copper or compound of copper.

Oda, in U.S. Pat. No. 6,060,021, disclosed a method of storing trichlorosilane and silicon tetrachloride under a hydrogen gas as a sealing gas.

Klein et al., in U.S. Pat. No. 6,843,972 B2, disclosed a method of purifying trichlorosilane by contacting with solid bases.

Block et al., in U.S. Pat. No. 6,852,301 B2 disclosed a method of producing silane by reacting metallurgical silicon with silicon tetrachloride, $SiCl_4$, and hydrogen, to form a crude gas stream of trichlorosilane, $SiHCl_3$, and silicon tetrachloride; removing impurities from the crude gas stream by washing with condensed chlorosilanes; condensing and separating the purified crude gas stream by distillation; returning the partial stream of silicon tetrachloride to the reaction of metallurgical silicon with silicon tetrachloride and hydrogen; disproportionating the partial stream to form silicon tetrachloride and silane; and returning the silane formed by disproportionation to the reaction of metallurgical grade silicon with silicon tetrachloride and hydrogen.

Block et al., in U.S. Pat. No. 6,887,448 B2, disclosed a method for production of high purity silicon.

Block et al., in U.S. Pat. No. 6,905,576 B1, disclosed a method and system for producing silane by catalytic disproportionation of trichlorosilane in a catalyst bed.

Bulan et al., in U.S. Pat. No. 7,056,484 B2, disclosed a method for producing trichlorosilane by reacting silicon with hydrogen, silicon tetrachloride, with the silicon in comminuted form mixed with a catalyst.

Bulan et al., in U.S. Patent Application Publication No. 2002/0044904 A1, disclosed a process for preparing trichlorosilane by reacting silicon with silicon tetrachloride, hydrogen, and optionally, hydrogen chloride, using a catalyst.

Bulan et al., in U.S. Patent Application Publication No. 2004/0022713 A1, disclosed a method for producing trichlorosilane by reacting silicon with hydrogen, silicon tetrachloride, and optionally, hydrogen chloride with a catalyst having an average grain size that is less than the average grain size of silicon used by a factor of 30 to 100.

Kajimoto et al., in U.S. Patent Application Publication No. 2007/0231236 A1, disclosed a method of producing halosilane and a method of purifying a solid fraction.

Bohmhammel et al., in U.S. Patent Application Publication No. 2009/0035205 A1, disclosed a process for preparing silicon tetrachloride by catalytic hydrodehalogenation of silicon tetrachloride with a catalyst that is at least one metal or metal salt of group 2 of the Periodic Table of the Elements.

Hsieh et al., in European Patent Specification Publication No. 0 444 190 B1, disclosed gas separation by semi-permeable membranes.

Allen, in European Patent Specification Publication No. 0 450 393 A2, disclosed an improved polysilicon and process therefor.

Ghetti, in International Publication No. 2006/054325 A2, disclosed a process and plant for the purification of trichlorosilane and silicon tetrachloride.

Andersen, et al., in International Publication No. 2007/035108 A1, disclosed a method for the production of trichlorosilane, and for producing silicon for use in the production of trichlorosilane.

SUMMARY OF THE INVENTION

One or more aspects of the invention pertain to a method of preparing trichlorosilane. In accordance with one or more embodiments, the method can comprise introducing a reactant mixture into a reactor, the reactant mixture comprising silicon tetrachloride and hydrogen; recovering a first crude product from the reactor, the first crude product comprising trichlorosilane, silicon tetrachloride, hydrogen, silicon, and metal salts; separating at least a portion of the silicon and the metal salts from the first crude product to produce a second crude product and a first residue, the second crude product comprising trichlorosilane, silicon tetrachloride, and hydrogen, and the first residue comprising trichlorosilane, silicon tetrachloride, silicon, and metal salts; and contacting at least a portion of the first residue with a contact gas to produce a solids-rich residue and a vapor product, the vapor product comprising trichlorosilane and silicon tetrachloride, and the solids-rich residue comprising silicon and metal salts.

The contact gas can comprise at least one of hydrogen and a non-condensable gas. In accordance with at least one variant of one or more embodiments of the invention, the method can further comprise condensing at least a portion of the second crude product to produce a crude condensate, and, preferably, contacting at least a portion of the crude condensate with the first crude product. In accordance with at least one further variant, the method can further comprise contacting at least a portion of the crude condensate with at least a portion of the vapor product. In accordance with at least one still further variant, the method can further comprise contacting at least a portion of the first residue with the first crude product. The method can further comprise separating at least a portion of trichlorosilane from at least a portion of the second crude product, recovering at least a portion of silicon tetrachloride from at least a portion of the second crude product, recovering at least a portion of hydrogen from at least a portion of the second crude product, and introducing at least a portion of the recovered hydrogen into the reactor. Where advantageous, the contact gas can at least partially be comprised of the recovered hydrogen. Further, the reactant mixture can at least partially be comprised of recovered hydrogen and, preferably, can be comprised of recovered silicon tetrachloride. One or more particular embodiments of the invention pertaining to separating the at least a portion of the silicon and the metal chloride salts from the first crude product can comprise introducing the first crude product into a quench column, recovering a second crude product from the quench column, and recovering a first residue from the quench column. Contacting the at least a portion of the first residue with the contact gas can comprise introducing the contact gas into a stripper column, introducing the at least a portion of the first residue into the stripper column, recovering the vapor product from the stripper column, and recovering the solids-rich residue from the stripper column. Further, separating the at least a portion of the silicon and the metal salts from the first crude product can comprise contacting the at least a portion of the first crude product with at least a portion of the vapor product from the stripper column.

In one or more further embodiments of the invention, the method can further comprise separating at least a portion of the silicon tetrachloride from the second crude product to produce recovered silicon tetrachloride and a third crude product comprising trichlorosilane and dichlorosilane, and introducing at least a portion of the recovered silicon tetrachloride into the reactor. The method can further comprise increasing a concentration of the recovered silicon tetrachloride in the product to produce a concentrated STC product, and introducing the concentrated STC product into the reactor. In one or more yet further embodiments of the invention, the method can further comprise recovering at least a portion of hydrogen in the second crude product, and introducing the at least a portion of the recovered hydrogen into the reactor with the concentrated STC product. In one or more even further embodiments of the invention, the method can comprise separating trichlorosilane from the third crude product to produce a trichlorosilane-rich product, and, in some cases, heating at least a portion of the reactant mixture to be introduced into the reactor with at least a portion of the first crude product from the reactor.

One or more aspects of the invention pertain to a system for synthesizing trichlorosilane. In accordance with one or more embodiments, the system can comprise a source of silicon tetrachloride; a source of hydrogen; a reactor fluidly connected to the source of silicon tetrachloride and to the source of hydrogen, the reactor having a reactor outlet; a quench column having a crude vapor inlet, a second vapor inlet, a crude vapor product outlet, and a residue outlet, the crude vapor inlet fluidly connected downstream from the reactor outlet; and a stripper column having an overhead liquid inlet, a contact gas inlet, and an overhead vapor outlet, the overhead liquid inlet fluidly connected downstream from the residue outlet of the quench column, and the overhead vapor outlet fluidly connected upstream to the second vapor inlet of the quench column. The system can further comprise a condenser having a condenser inlet, a condensate outlet, and a condenser outlet, the condenser inlet fluidly connected downstream from the crude vapor product outlet, and the condenser outlet fluidly connected upstream of a trichlorosilane, dichlorosilane, silicon tetrachloride separation train, and the condensate outlet fluidly connected upstream of an overhead condensate inlet of the quench column. Further configurations of the present inventive system can comprise a residue pump having a pump inlet and a pump outlet, the pump inlet fluidly connected downstream from the residue outlet of the quench column, and wherein the pump outlet is fluidly connected upstream of the overhead liquid inlet of the stripper column, and upstream of a residue recycle inlet of the quench column.

The system can further comprise a hydrogen recovery system having a recovered hydrogen outlet; the hydrogen recovery system is typically fluidly connected downstream from the condenser outlet. In still further embodiments, the contact gas inlet of the stripper column is fluidly connected downstream from the recovered hydrogen outlet. The system of synthesizing trichlorosilane can also further comprise a source of a contact gas stream fluidly connected upstream of the contact gas inlet of the stripper column. The contact gas stream typically comprises hydrogen.

The system can further comprise a heat exchanger having a first fluid side and a second fluid side in thermal communication with the first fluid side, the first fluid side fluidly connecting at least one of the source of hydrogen and the source of silicon tetrachloride to the reactor, and the second fluid side fluidly connecting the reactor outlet to the crude vapor inlet of the quench column. The heat exchanger can thus have a first inlet and a first outlet fluidly connecting a source of hydrogen and a source of silicon tetrachloride to an inlet of the reactor. The heat exchanger can also have a second inlet and a second outlet fluidly connecting an outlet of the reactor to an inlet of quench column.

One or more embodiments relevant to a method of synthesizing trichlorosilane of the present invention can comprise hydrogenating silicon tetrachloride in a fluidized bed reactor to produce trichlorosilane in a first crude product stream, wherein the first crude product stream can further comprise silicon tetrachloride, hydrogen, silicon, and at least one metal salt; separating at least a portion of the silicon and the at least one metal salt from the first crude product stream in a first separation column to produce a first residue stream and a second crude product stream, wherein the first residue stream can further comprise trichlorosilane and silicon tetrachloride; and vaporizing at least a portion of the trichlorosilane and at least a portion of the silicon tetrachloride from at least a portion of the first residue stream with a contact stream in a second column to produce a vapor product stream and a solids-rich slurry stream, wherein the solids-rich slurry stream can comprise at least one metal salt and typically, silicon, and wherein the vapor product stream can comprise vaporized trichlorosilane and vaporized silicon tetrachloride. Vaporizing the at least a portion of the trichlorosilane and the at least a portion of the silicon tetrachloride from the at least a portion of the first residue stream with the contact stream can comprise, in one or more variants or embodiments of the present invention, contacting the at least a portion of the first residue stream with the contact stream that comprises at least one of hydrogen and one or more non-condensable gases. Further, separating the at least a portion of the silicon and the at least one metal salt from the first crude product stream can comprise, in still other variants or embodiments of the method of synthesizing trichlorosilane, contacting at least a portion of the first crude product stream with the first residue stream. Still other variants of the method of synthesizing trichlorosilane can comprise condensing at least a portion of the second crude product stream to produce a crude condensate stream, and contacting the first crude product stream with the crude condensate stream. In conjunction with, or alternative to, any of the herein-noted variants of the method of synthesizing trichlorosilane, the method can further involve recovering at least a portion of hydrogen from the second crude product stream, and vaporizing the at least a portion of the trichlorosilane and the at least a portion of the silicon tetrachloride from the at least a portion of the first residue stream with at least a portion of the recovered hydrogen. In further additional or alternative variants of the method of synthesizing trichlorosilane, hydrogenating the silicon tetrachloride can comprise hydrogenating silicon tetrachloride with at least a portion of the recovered hydrogen. The method of synthesizing trichlorosilane, in one or more variants of the above-noted embodiments, can further comprise recovering at least a portion of silicon tetrachloride from the second crude product stream. Hydrogenating silicon tetrachloride can comprise hydrogenating at least a portion of the recovered silicon tetrachloride with at least a portion of the recovered hydrogen. The method can further comprise, prior to hydrogenating silicon tetrachloride, heating at least a portion of the reactant mixture of silicon tetrachloride and hydrogen with at least a portion of the first crude product stream.

One or more embodiments of the present invention relevant to a method of preparing trichlorosilane can comprise providing a reactant mixture comprising silicon tetrachloride and hydrogen; introducing the reactant mixture into a reactor having reaction conditions that hydrogenates at least a portion of the silicon tetrachloride into trichlorosilane; recovering a crude product comprising silicon tetrachloride, hydrogen, trichlorosilane, and metal salts; heating at least a portion of the reactant mixture with at least a portion of the crude product; and separating trichlorosilane from at least a portion of the crude product to produce a trichlorosilane product. The method can further comprise separating the crude product into a residue and a crude vapor product; recovering hydrogen from at least a portion of the crude vapor product; contacting at least a portion of the residue with at least a portion of the recovered hydrogen to produce a vapor product and a solids-rich residue comprising a metal salt; and contacting the crude product with the vapor product.

BRIEF DESCRIPTION OF THE DRAWINGS

The accompanying drawings are not drawn to scale. In the drawings, each identical or nearly identical component that is illustrated in various figures is represented by a like numeral. For purposes of clarity, not every component may be labeled in every drawing.

In the drawings.

DETAILED DESCRIPTION

Trichlorosilane can be manufactured by hydrochlorination involving reacting silicon tetrachloride with metal grade silicon and hydrogen in a reactor. The produced chlorosilanes are typically recovered as a slurry containing metal silicon fines from the reactor along with metal salts, such as volatilized metal chloride salts.

The metal salts can be transition metal chlorides and alkali earth metal chlorides. Non-limiting examples of metal salts include iron chloride, calcium chloride, and aluminum chloride. The metals that can serve as precursors of the metal salts can be introduced into the trichlorosilane synthesis process as impurities or contaminants of one or more reactants. For example, metallurgical grade silicon can have metal components, typically from about 1 wt % to about 5 wt %. Metal precursors of the salts can be any one or more of iron, aluminum, and calcium. Further sources of the precursors of the metal salts include catalysts such as those that contain copper. Other sources of metallic impurities include the whetted components of the unit operations involved or associated with the trichlorosilane synthesis.

Some aspects of the present invention are directed to systems and techniques for increasing the concentration of the solids in the slurry to recover the volatilized metal salts and reduce the obstructions created by the solidification of the metal salts in downstream operations. Rather than heating to raise the temperature to vaporize chlorosilane compounds and subsequently condensing the volatilized chlorosilane compounds, the present invention provides for increasing the solids concentration in the slurry stream by utilizing a non-condensable gas, which can be an inert gas, to volatilize at least a portion of the chlorosilane components, which can consequently promote conditions that reduce the temperature of the slurry portion. Thus, the present invention can, in effect, reduce the volatility of metal salts by reducing the temperature of the slurry, which, in turn, can facilitate separation and reduce the likelihood of carryover thereof to downstream unit operations. The present invention can thus involve systems and processes that can reduce the likelihood of solids deposition in downstream separation operations.

One or more aspects of the present invention can be directed to systems and techniques of producing trichlorosilane. Some aspects of the invention involve selective vaporization or unit operations that facilitate selective vaporization of components of a crude product of a hydrogenation reaction. Further aspects of the invention can involve recovering one or more unused reactants of the hydrogenation reaction and utilizing such one or more recovered, unused reactants in one or more vaporization unit operations to effect separation of solids or depositable components that are byproducts of the hydrogenation operation. Still further aspects of the invention involve recovering energy or unit operations that facilitate energy recovery to facilitate the trichlorosilane synthesis. Even further aspects of the invention can involve condensing or unit operations that facilitate condensing at least a portion of one or more components of the hydrogenation product and utilizing at least a portion of the condensed one or more components to effect separation of at least a portion of one or more byproducts of the hydrogenation reaction.

Portions of the present disclosure are presented with respect to a stream or streams; however, the present invention is not limited to continuously or continually operating systems and techniques and can be practiced or implemented by a person skilled in the art in batch or semi-batch operations or operating systems. Thus, reference to a stream or streams can be pertinent to a volume, mass or other discrete unit.

Figure 1:
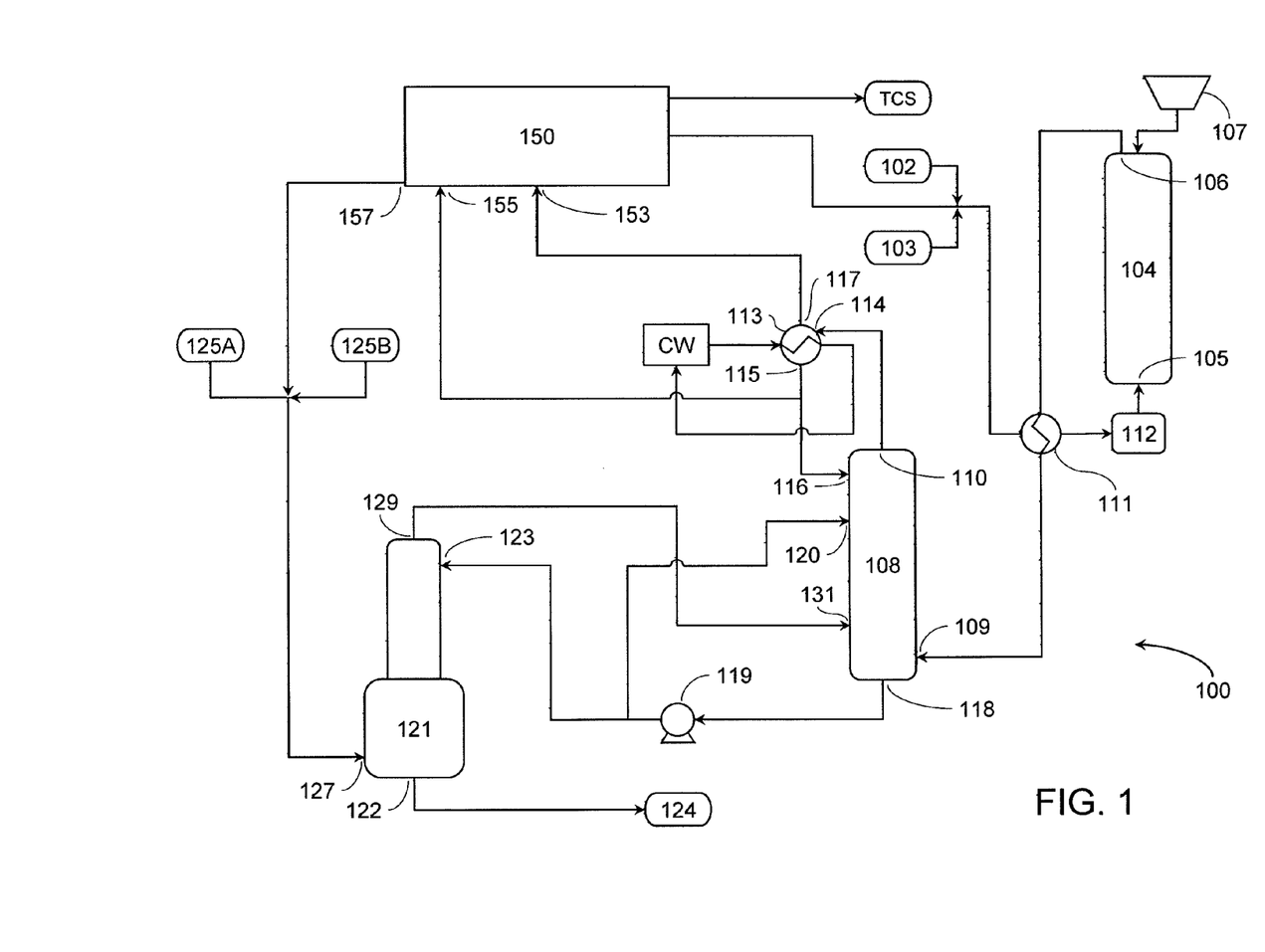
FIG. 1 is a schematic drawing showing a process flow diagram of a portion of a system in accordance with one or more aspects of the invention.

One or more aspects of the invention pertain to methods and techniques for preparing or synthesizing trichlorosilane. FIG. 1 exemplarily illustrates a system 100 for synthesizing a silane, such as trichlorosilane, in accordance with one or more embodiments of the invention. System 100 can comprise a source 102 of silicon tetrachloride; a source 103 of hydrogen; a reactor 104, or a plurality of reactors, fluidly connected to source 102 of silicon tetrachloride and to source 103 of hydrogen. Reactor 104 can have a plurality of inlets fluidly connected to one or more of sources 102 and 103. In some configurations, however, reactor 104 can have a single inlet 105 fluidly connected to both sources 102 and 103, as a reactant mixture or reactant stream comprising silicon tetrachloride and hydrogen. Reactor 104 further typically has one or more reactor outlets 106.

System 100 can further comprise a first column, such as a quench column 108 that, as illustrated, can have a first inlet 109, which can be a first crude product inlet, or a crude vapor inlet, fluidly connected to outlet 106 of reactor 104. Column 108 can further comprise a first outlet, which can be a crude vapor product outlet 110.

The system can further comprise one or more heat exchangers having a first inlet, a first outlet, a second inlet, and a second outlet. The first inlet can be fluidly connected to at least one of the source of hydrogen and the source of silicon tetrachloride and the first outlet fluidly connected upstream of the reactor. In some configurations, the heat exchanger can have a first fluid side in thermal communication with a second fluid side, the first fluid side fluidly connecting at least one of the source of hydrogen and the source of silicon tetrachloride to the reactor and the second fluid side fluidly connected to a source of a heating medium. For example, as illustrated in FIG. 1, system 100 can have one or more heaters 112 disposed to heat at least a portion of the reactant mixture from any one or more of sources 102 and 103 prior to introduction into reactor 104. Other configurations of the system contemplate utilizing heaters or heat exchanging unit operations to raise the temperature of the reactant mixture of silicon tetrachloride and hydrogen to be introduced into reactor 104. For example, a heat exchanger 111 can have a first inlet and a first outlet fluidly connecting a source of hydrogen and a source of silicon tetrachloride to an inlet of reactor 104. Heat exchanger 111 can also have a second inlet and a second outlet fluidly connecting outlet 105 of reactor 104 to inlet 109 of column 108.

A source 107 of silicon can be utilized to provide, for example, metallurgical grade silicon metal to reactor 104.

System 100 can further comprise a cooling unit operation or condenser 113 that is fluidly connected to column 108. Typically, condenser 113 has a condenser inlet 114 that is fluidly connected downstream from outlet 110 to receive a second crude product from column 108. Cooling water from a cooling system CW can be utilized in condenser 113 to effect heat transfer from the second crude product stream leaving from column 108 to condense, at least partially, components thereof into a crude condensate. Other configurations can also be utilized to facilitate condensation. For example, condenser 113 can be an air exchanger that utilizes ambient air as the cooling medium. Condenser 113 typically further has a condensate outlet 115 that is fluidly connected to an overhead condensate inlet such as a second inlet 116 of column 108 to facilitate delivery of the recovered crude condensate from condenser 113 into column 108.

Condenser 113 can further have a second outlet or condenser outlet 117 to facilitate recovery or exit of a portion of the second crude product, typically comprising components that have not condensed in the condenser.

Column 108 further comprises a residue outlet 118 to facilitate recovery or exit of a first residue from column 108. A pump 119 can be utilized to facilitate transfer of the first residue and delivery or return of a portion of the first residue to column 108 through a residue recycle inlet 120 thereof.

In other configurations, a venturi tube can be utilized to facilitate withdrawal of the first crude product from reactor 104 and introduction into column 108. For example, an outlet of pump 119 can be fluidly connected upstream to a convergent, inlet section of the venturi tube. An outlet of the venturi tube can be connected upstream of inlet 120 of column 108 while a second inlet of the venturi tube, proximate the throat section, can be fluidly connected downstream from crude product outlet 106 of reactor 104, typically through heat exchanger 111.

In preferred configurations in accordance with some aspects of the invention, system 100 further comprises a second column or a stripper column 121, having an overhead liquid inlet 123 that is fluidly connected to an outlet of pump 119 to facilitate delivery or introduction of at least a portion of the first residue stream from column 108. Thus, in some cases, overhead liquid inlet 123 is fluidly connected downstream from residue outlet 118 of quench column 108.

System 100 can also comprise one or more sources 125A and 125B of a contact gas. When any or both of sources 125A and 125B are utilized, each is fluidly connected to provide the contact gas to column 121 through at least one inlet, such as contact inlet 127 thereof. Typically, column 121 has at least one overhead vapor outlet 129 for recovery of a vapor product, which is preferably introduced or transferred into column 108 by way of a second vapor inlet 131 of the quench column. Thus, the second vapor inlet of the quench column can be fluidly connected to the overhead vapor outlet of the stripper column.

The term "non-condensable gas" refers to any gas that remains in a gaseous state in the various primary unit operations under conditions directed to hydrochlorination and solids byproduct separation. For example, a non-condensable gas can be any gas that does not condense in any of units 104, 108, 121, and 113. The contact gas can comprise hydrogen, an inert gas, or both that can at least partially effect vaporization of any of trichlorosilane, silicon tetrachloride, and dichlorosilane.

Column 121 can also have a bottoms outlet or a solids-rich residue outlet 122 for recovery of a solids-rich stream from the stripper column. The solids-rich stream can be delivered to a final recovery system 124 that retrieves useful components, such as chlorosilanes, before disposal of the solid salts as waste.

In accordance with at least one variant of one or more embodiments of the invention, system 100 further comprises one or more separation trains 150 that effects purification or separation of components of the second crude product. For example, system 100 can comprise one or more trains comprising a plurality of unit operations that separate trichlorosilane, dichlorosilane, silicon tetrachloride as components of the second crude product from column 108. Thus, the crude product separation train and the hydrogen recovery system can be fluidly connected downstream from the condenser outlet 117 through a first train inlet 153. In some cases, a portion of the crude condensate from condenser 113 can also be directed into train 150 through a second train inlet 155 to recover any of trichlorosilane, dichlorosilane, silicon tetrachloride components in the crude condensate. Thus, second train inlet 155 can be fluidly connected downstream from condensate outlet 115 of the condenser.

The hydrogen recovery system typically separates hydrogen gas by condensing at least a portion of each of the silane-type compounds including, but not limited to trichlorosilane and dichlorosilane, as well as silicon tetrachloride from the second crude product of column 108, and, in some cases, the crude condensate from condenser 113. Other techniques that effect separation or recovery of hydrogen gas can be utilized.

In some embodiments of the invention, system 100 can involve configurations that utilize at least a portion of recovered hydrogen from the hydrogen recovery system. For example, recovered hydrogen can be utilized as a reactant in a silicon tetrachloride hydrogenation reaction. The recovered hydrogen can be introduced into reactor 104 as a separate stream, or with silicon tetrachloride. In other configurations, recovered hydrogen can be from, for example, a recovered hydrogen outlet 157 of the hydrogen recovery system, which is exemplarily illustrated as, but is not necessarily a subsystem of train 150. The contact gas can comprise, at least partially, recovered hydrogen from the reactor.

Figure 2:
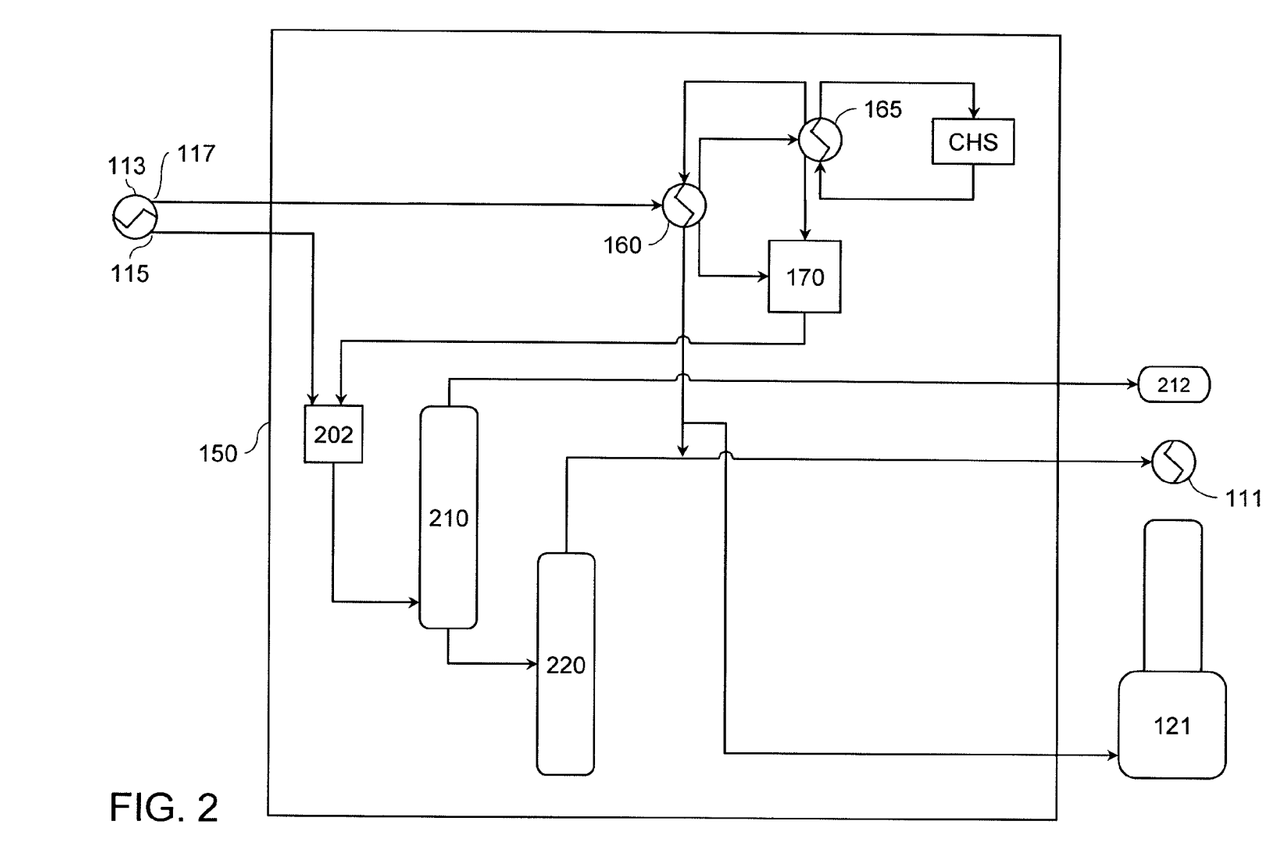
FIG. 2 is a schematic drawing showing a process flow diagram of a portion of a system in accordance with one or more aspects of the invention.

FIG. 2 exemplarily illustrates unit operations that can be utilized in train 150. For example, train 150 can comprise a tank disposed to receive crude condensate from condenser 113. Train 150 can further comprise a separation column 210 fluidly connected to an outlet of tank 202 and receiving a mixed liquor. Mixed liquor from tank 202 can comprise silicon tetrachloride, trichlorosilane, and, depending on the operating conditions of upstream unit operations, dichlorosilane. Column 210 can be operated to at least partially separate trichlorosilane from the mixed liquor to produce a product stream comprising trichlorosilane, typically as an overhead stream of column 210, which can be delivered to storage. In other cases, however, the product stream can be further purified in one or more operations (not shown) to remove impurities such as dichlorosilane and recover trichlorosilane.

A byproduct stream from column 210 can be introduced into column 220 to facilitate separation of silicon tetrachloride therefrom. Typically, an overhead stream from column 220 comprises the recovered silicon tetrachloride, which can be introduced as a component of the reactant mixture to be delivered to reactor 104, such as by way of heater 112.

As noted, train 150 can comprise a hydrogen recovery subsystem, which can include unit operations that condense substantially all components of the second crude product except for hydrogen. For example, hydrogen recovery can be effected by cooling the second crude product from column 108 and condenser 113 with one or more chillers 160 and 165. Cooling media that effects condensation of the condensable components of the second crude product can be provided by a cooler CHS. A recovered stream, typically comprising silicon tetrachloride and trichlorosilane, from coolers 160 and 165 can be introduced into accumulation tank 202 directly, or be collected in tank 170. Recovered hydrogen from the chillers 160 and 165 can then be utilized, as noted above, to comprise the contact gas to be introduced into column 121, to comprise the reactant mixture to be introduced into reactor 104, or both.

One or more aspects of the invention can be directed to a method of synthesizing trichlorosilane. The method, as represented in one or more embodiments herein, can comprise introducing a reactant mixture into reactor 104. The reactant mixture typically comprises silicon tetrachloride and hydrogen. The method can further comprise recovering a first crude product from reactor 104, separating at least a portion of the metal salts from the first crude product to produce a second crude product and a first residue, and contacting at least a portion of the first residue with a contact gas to produce a solids-rich residue and a vapor product. One or more embodiments of the present invention relevant to a method of synthesizing trichlorosilane can comprise hydrogenating silicon tetrachloride in a fluidized bed reactor, such as unit 104, to produce trichlorosilane in a first crude product stream; separating at least a portion of the silicon and the at least one metal salt from the first crude product stream in a first separation column, such as unit 108, to produce a first residue stream and a second crude product stream; and vaporizing at least a portion of trichlorosilane and at least a portion of silicon tetrachloride from at least a portion of the first residue stream with a contact stream in a second column, such as unit 121, to produce a vapor product stream and a solids-rich slurry stream, wherein the solids-rich slurry stream comprises at least one metal salt and silicon, and the vapor product stream comprises vaporized trichlorosilane and vaporized silicon tetrachloride.

The first crude product typically comprises, at least, trichlorosilane, silicon tetrachloride, hydrogen, silicon, and metal salts. The second crude product typically comprises trichlorosilane, silicon tetrachloride, and hydrogen; and the first residue typically comprises trichlorosilane, silicon tetrachloride, silicon, and metal salts. The vapor product typically comprises trichlorosilane and silicon tetrachloride; and the solids-rich residue typically comprises silicon and metal salts. The contact gas can comprise hydrogen, such as recovered hydrogen.

In accordance with at least one variant of one or more embodiments of the invention, the method can further comprise condensing at least a portion of the second crude product to produce a crude condensate, and, preferably, contacting at least a portion of the crude condensate with the first crude product.

In accordance with at least one further variant, the method can further comprise contacting at least a portion of the crude condensate with at least a portion of the vapor product. In accordance with at least one still further variant, the method can further comprise contacting at least a portion of the first residue with the first crude product.

In accordance with at least one yet further variant, the method can further comprise separating at least a portion of trichlorosilane from at least a portion of the second crude product, recovering at least a portion of silicon tetrachloride from at least a portion of the second crude product, recovering at least a portion of hydrogen from at least a portion of the second crude product, and introducing at least a portion of the recovered hydrogen into the reactor.

Preferred embodiments of the method of the invention can involve utilizing recovered hydrogen as at least partially comprising the contact gas. In some cases, the reactant mixture is at least partially comprised of the recovered hydrogen and, preferably, also comprised of recovered silicon tetrachloride. The method can thus further comprise separating at least a portion of the silicon tetrachloride from the second crude product to produce recovered silicon tetrachloride and a third crude product comprising trichlorosilane and dichlorosilane, and introducing at least a portion of the recovered silicon tetrachloride into reactor 104.

One or more particular embodiments of the invention pertaining to separating the at least a portion of the metal chloride salts from the first crude product that comprises introducing the first crude product into quench column 108, recovering the second crude product from quench column 108, and recovering the first residue from quench column 108. Contacting the at least a portion of the first residue with the contact gas can comprise introducing the contact gas into stripper column 121, introducing the at least a portion of the first residue into stripper column 121, recovering the vapor product from stripper column 121, and recovering the solids-rich residue from stripper column 121. Separating the at least a portion of the metal salts from the first crude product can comprise contacting the at least a portion of the first crude product with at least a portion of the vapor product from stripper column 121.

In one or more still further embodiments of the invention, the method can further comprise increasing a concentration of the recovered silicon tetrachloride in the product to produce a concentrated STC product, and introducing the concentrated STC product into reactor 104. In one or more yet further embodiments of the invention, the method can further comprise recovering at least a portion of hydrogen in the second crude product, and introducing the at least a portion of the recovered hydrogen into reactor 104 with the concentrated STC product.

In one or more even further embodiments of the invention, the method can further comprise separating trichlorosilane from the third crude product to produce a trichlorosilane-rich product.

The method can further comprise heating at least a portion of the reactant mixture to be introduced into reactor 104 with the first crude product from the reactor 104.

Vaporizing the at least a portion of the trichlorosilane and the at least a portion of the silicon tetrachloride from the at least a portion of the first residue stream with the contact stream can comprise, for example, contacting the at least a portion of the first residue stream with the contact stream, which can comprise at least one of hydrogen and a non-condensable gas. Further, separating the at least a portion of the silicon and the at least one metal salt from the first crude product stream can comprise, in still other variants or embodiments of the method of synthesizing trichlorosilane, contacting at least a portion of the first crude product stream with the first residue stream.

The method of synthesizing trichlorosilane can further comprise condensing at least a portion of the second crude product stream to produce a crude condensate stream, and contacting the first crude product stream with the crude condensate stream.

In combination with, or alternative to, any of the above-noted variants of the method of synthesizing trichlorosilane, the method can further involve recovering at least a portion of hydrogen from the second crude product stream. Vaporizing the at least a portion of the trichlorosilane and the at least a portion of the silicon tetrachloride from the at least a portion of the first residue stream can involve vaporizing any of silicon tetrachloride, trichlorosilane, and dichlorosilane with at least a portion of the recovered hydrogen.

Still further aspects can pertain to a method of modifying an existing system that synthesizes silane or trichlorosilane. The method of modifying can involve retrofitting or installing one or more unit operations into the existing synthesizing system. Depending on the existing unit operations, the method can involve providing one or more unit operations that facilitates vaporization of one or more components of a reaction product of a reactor of the synthesizing system. For example, where the existing system comprises at least one reactor that facilitates synthesis of a product stream containing a silane precursor compound, the method of modifying the existing system can involve fluidly connecting one or more quench columns to an outlet of the reactor that provides the product stream. The method can, in some cases, further comprise fluidly connecting one or more contact stripper columns downstream from the reactor.

The contact gas can comprise any gas that facilitates vaporization of at least one of trichlorosilane, dichlorosilane, and silicon tetrachloride, preferably without reaction therewith at the contact or vaporization conditions. For example, the contact gas can comprise any of nitrogen, argon, and helium. Where one or more non-condensable gases are utilized, preferred aspects of the invention can involve separating or recovering at least a portion of the non-condensable gas from the system. Recovery of the gas can be effected by, for example, refrigeration to reduce the temperature of the gas-containing stream to liquefy the condensable portions thereby retrieving therefrom the non-condensable gas portion.

Reactor 104 is typically operated at conditions that facilitate conversion of silicon tetrachloride into trichlorosilane, such as by hydrogenation. Reactor 104 can comprise a reactor having metallurgical grade silicon therein. In preferred configurations, reactor 104 can be a fluidized bed reactor, with a fluidized bed comprising metallurgical grade silicon. The reaction can be performed in a fluidized bed at temperature in a range of from about 300° C. to about 600° C., and at a pressure in a range of from about 100 psig to about 600 psig, typically about 325 psig, according to the reaction:

$$3SiCl_4 + 2H_2 + Si \rightarrow 4HSiCl_3.$$

The reactant mixture introduced into reactor 104 can have a stoichiometric ratio of silicon tetrachloride and hydrogen; however, the molar ratio can be about 1:1.

The reactant mixture can be introduced into the reactor under conditions that thermodynamically favors the reaction. For example, the reactant mixture at a pressure of about 325 psig can be heated in heaters 111 and 112 to about 500° C.

Quench column 108 can be a fractionating or distillation column that facilitates mass separation of a feed stream, such as the first crude product comprising trichlorosilane, silicon tetrachloride, dichlorosilane, and hydrogen. Typically, separation in column 108 creates a distillate fraction, which can be the second crude product stream, and a bottoms fraction, which can be the first residue stream. However, some configurations can utilize fractionating columns that have a plurality of outlets at intervals along the column so that multiple products may be withdrawn from the column. Stripper column 121 can also be a fractionating column that effects fractionation of the first residue stream by vaporization of at least a portion of any of trichlorosilane, silicon tetrachloride, and dichlorosilane.

In operation, column 108 can have down-flowing liquid traffic, which can be crude condensate and a first residue stream counter-currently flowing and contacting up flowing vapors, typically from the first crude product stream, and the overhead vapor product stream from stripper column 121.

Contacting structures can be utilized in the columns. For example, bubble-cap trays or plates can be used to facilitate contact between the up flowing vapor traffic and the down flowing liquid traffic in the column. Packing material can also used in the column instead of trays, especially when a low pressure drop through the column is desired. The material can either be random dumped packing of Raschig rings or structured sheet metal.

The design and operation of the fractionating columns and other ancillary units depends on the composition of the feed and as well as the composition of the desired products. For a multi-component feed, simulation models can be used to design and operate the columns. For example, column 108 can be operating at a temperature in a range of from about 90° C. to about 180° C., typically about 135° C., and at a pressure in a range of from about 100 psig to about 600 psig, typically at about 325 psig. Column 121 can be operating at a temperature in a range of from about 35° C. to about 180° C., such as at about 115° C., and at a pressure in a range of from about 100 psig to about 600 psig.

Condenser 113 can be operating to condense at least a portion of components of the crude vapor from column 108 to a temperature in a range of from about 80° to about 40° C.

The present invention can also involve utilizing one or more control systems (not shown) to monitor and regulate operation of one or more parameters of any unit operation of the system. For example, the control system can be utilized to monitor and regulate operating conditions of any of the unit operations of system 100, such as the temperature and pressure in reactor 104, and the flow rate of the reactant mixture in reactor 104, to respective target values. In some cases, the same or a different control system can be utilized to monitor and regulate operating conditions in any of columns 108 and 121. For example, the flow rate of the contact gas stream can be monitored and be controlled to provide one or more predetermined, target, or set point values, or to be dependent on other operating conditions of the stripper column, or even the quench column. Other monitored or controlled parameters can be the temperature, the pressure, and the flow rates of any of the streams to and from columns 108 and 121, condenser 113, pump 119, and heater 112. Further, the composition of any of the streams in system 100 can be a controlled or controlling parameter.

The controller may be implemented using one or more computer systems (not shown), which may be, for example, a general-purpose computer or a specialized computer system. Non-limiting examples of control systems that can be utilized or implemented to effect one or more processes of the systems or subsystems of the invention include distributed control systems, such as the DELTA V digital automation system from Emerson Electric Co., and programmable logic controllers, such as those available from Allen-Bradley or Rockwell Automation, Milwaukee, Wis.

EXAMPLES

The function and advantages of these and other embodiments of the invention can be further understood from the example below, which illustrates the benefits and/or advantages of the one or more systems and techniques of the invention but do not exemplify the full scope of the invention.

Example 1

This example describes a simulated system in accordance with one or more embodiments of the invention. The simulated system is substantially represented as FIGS. 1 and 2 and as discussed above. The contact gas utilized to facilitate vaporization in stripper column 121 was hydrogen.

Table 1 presents the composition, in approximate weight percent, and operating parameters of some of the streams to and from reactor 104.

Table 2 presents the composition, in approximate weight percent, and operating parameters of some of the streams to and from quench column 108 and condenser 113.

Table 3 presents the composition, in approximate weight percent, and operating parameters of some of the streams to and from stripper column 121.

The impurities typically include silanes, such as, but not limited to, silane, disilane, monochlorosilane, hexachlorosilane and methyl dichlorosilane; chlorides, such as but not limited to phosphoric chloride, boron trichloride, and phosphorus trichloride; diborane; methane; phosphine; and water.

The metals typically include iron, calcium, and aluminum; and the metal salts typically include iron chloride, calcium chloride, and aluminum chloride.

TABLE 1

| Stream | Si from Source 107 | Reactant Mixture from Heater 112 into Reactor 104 | First Crude Product from Reactor 104 into Column 108 |
|---|---|---|---|
| Silicon | 98.76 | 0 | 0.01 |
| Hydrogen Chloride | 0 | 0.1 | 0.2 |
| Dichlorosilane | 0 | 0.01 | 0.18 |
| Trichlorosilane | 0 | 0.34 | 19.81 |
| Silicon Tetrachloride | 0 | 97.1 | 77.66 |
| Hydrogen | 0 | 2.3 | 2.04 |
| Impurities | 0.24 | 0.1 | 0.18 |
| Metal or Metal Salts | 10 | 0 | 0.04 |
| Temperature C. | 40.0 | 580 | 551.5 |
| Pressure bar G | 27.0 | 22.5 | 19.8 |
| Vapor mole fraction | 0.0 | 1.0 | 1.0 |

TABLE 2

| Stream | First Crude Product from Heat Exchanger 111 into Column 108 | Second Crude Product from Outlet 117 of Condenser 113 | Crude Condensate from Condenser 113 into Inlet 116 | Overhead Vapor Product from Stripper Column 121 into Inlet 131 | First Residue from Outlet 118 into Inlet 120 |
|---|---|---|---|---|---|
| Silicon | 0.01 | 0 | 0 | 0 | 0.15 |
| Hydrogen Chloride | 0.2 | 0.15 | 0.19 | 0.2 | 0 |
| Dichlorosilane | 0.18 | 0.5 | 0.64 | 0.06 | 0.04 |
| Trichlorosilane | 19.81 | 26.5 | 33.78 | 8.1 | 7.63 |
| Silicon Tetrachloride | 77.66 | 51.17 | 65.23 | 87.77 | 89.76 |
| Hydrogen | 2.04 | 21.4 | 0 | 3.48 | 0.02 |
| Impurities | 0.18 | 0.13 | 0.17 | 0.36 | 2.4 |
| Metal Salts | 0.04 | 0 | 0 | 0 | 0.56 |
| Temperature C. | 300 | 42.5 | 42.5 | 116.7 | 151 |
| Pressure bar G | 19.6 | 19.4 | 19.4 | 19.6 | 34.0 |
| Vapor mole fraction | 1.0 | 1.0 | 0.0 | 1.0 | 0.0 |

TABLE 3

| Stream | First Residue from Outlet 118 into Inlet 123 | Contact Gas into Inlet 127 | Overhead Vapor Product from Stripper Column 121 into Inlet 131 | Solids-Rich Stream from Outlet 122 into Waste 124 |
|---|---|---|---|---|
| Silicon | 0.15 | 0 | 0 | 4.3 |
| Hydrogen Chloride | 0 | 5.3 | 0.2 | 0 |
| Dichlorosilane | 0.04 | 0.44 | 0.06 | 0 |

TABLE 3-continued

| Stream | First Residue from Outlet 118 into Inlet 123 | Contact Gas into Inlet 127 | Overhead Vapor Product from Stripper Column 121 into Inlet 131 | Solids-Rich Stream from Outlet 122 into Waste 124 |
|---|---|---|---|---|
| Trichlorosilane | 7.63 | 9.04 | 8.1 | 0.56 |
| Silicon Tetrachloride | 89.76 | 3.96 | 87.77 | 78.82 |
| Hydrogen | 0.02 | 80.8 | 3.48 | 0 |
| Impurities | 2.4 | 0.33 | 0.36 | 0.6 |
| Metal Salts | 0.56 | 0 | 0 | 15.72 |
| Temperature C. | 151 | 320 | 116.7 | 120 |
| Pressure bar G | 34.0 | 27.0 | 19.6 | 19.6 |
| Vapor mole fraction | 0.0 | 1.0 | 1.0 | 0.0 |

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name, but for use of the ordinal term, to distinguish the claim elements.

What is claimed is:

1. A system for synthesizing trichlorosilane comprising:
a source of silicon tetrachloride;
a source of hydrogen;
a reactor fluidly connected to the source of silicon tetrachloride and to the source of hydrogen, the reactor having a reactor outlet;
a quench column having a crude vapor inlet, a second vapor inlet, a crude vapor product outlet, and a residue outlet, the crude vapor inlet fluidly connected downstream from the reactor outlet; and
a stripper column having an overhead liquid inlet, a contact gas inlet, and an overhead vapor outlet, the overhead liquid inlet fluidly connected downstream from the residue outlet of the quench column, and the overhead vapor outlet fluidly connected to the second vapor inlet of the quench column.

2. The system of claim 1, further comprising a condenser having a condenser inlet, a condensate outlet, and a condenser outlet, the condenser inlet fluidly connected downstream from the crude vapor product outlet, the condenser outlet fluidly connected upstream of a trichlorosilane, dichlorosilane, silicon tetrachloride separation train, and the condensate outlet fluidly connected upstream of an overhead condensate inlet of the quench column.

3. The system of claim 2, further comprising a residue pump having a pump inlet and a pump outlet, the pump inlet fluidly connected downstream from the residue outlet of the quench column, and the pump outlet fluidly connected upstream of the overhead liquid inlet of the stripper column, and upstream of a residue recycle inlet of the quench column.

4. The system of claim 3, further comprising a hydrogen recovery system having a recovered hydrogen outlet, the hydrogen recovery system fluidly connected downstream from the condenser outlet.

5. The system of claim 4, wherein the contact gas inlet of the stripper column is fluidly connected downstream from the recovered hydrogen outlet.

6. The system of claim 1, further comprising a source of a contact gas stream fluidly connected upstream of the contact gas inlet of the stripper column, the contact gas stream comprising hydrogen.

7. The system of claim 1, further comprising a heat exchanger having a first fluid side and a second fluid side in thermal communication with the first fluid side, the first fluid side fluidly connecting at least one of the source of hydrogen and the source of silicon tetrachloride to the reactor, and the second fluid side fluidly connecting the reactor outlet to the crude vapor inlet of the quench column.

\* \* \* \* \*